Dec. 7, 1965   C. F. BACHLE   3,221,722
PISTON
Filed Jan. 3, 1964   2 Sheets-Sheet 1

INVENTOR.
CARL F. BACHLE
BY
Hauke + Hauke
ATTORNEYS

Dec. 7, 1965

C. F. BACHLE 3,221,722

PISTON

Filed Jan. 3, 1964

INVENTOR.
CARL F. BACHLE

BY

ATTORNEYS

United States Patent Office 3,221,722
Patented Dec. 7, 1965

3,221,722
PISTON
Carl F. Bachle, Grosse Pointe, Mich., assignor to Continental Aviation and Engineering Corporation, Detroit, Mich., a corporation of Virginia
Filed Jan. 3, 1964, Ser. No. 335,567
22 Claims. (Cl. 123—41.35)

The present invention relates to internal combustion engines, particularly to such engines in which the combustion chamber is arranged entirely or substantially within the face of the piston and more particularly to a new piston assembly for such engines.

The advantages of providing the combustion chamber within the face of the piston have been known for some time. It has also been proven that the most desirable shape for such a combustion chamber is in the form of a nearly hemispherical hollow space or cavity. There are, however, certain inherent disadvantages in providing such a piston construction which have not been satisfactorily overcome. Because the most desirable configuration for the combustion chamber is in the form of a hemisphere, a thin lip is formed at the entrance to the combustion chamber. This edge or lip of the piston face which defines the entrance to the combustion chamber has the tendency to crack or break under the extreme temperatures produced in the combustion chamber during operation of the engine. Further, such a construction positions the combustion chamber closely adjacent the area of the piston ring grooves. The heat transmitted from the combustion chamber to the piston ring area has the tendency to warp and distort the rings and because such temperatures are higher than the coking temperature of the fuels being used to operate the engine, deposits will be produced in the top ring groove.

The present invention overcomes these difficulties by providing a hollow piston and an insert member adapted to be carried by the piston. The insert member is provided with the cavity forming the combustion chamber. A thermal dam is provided between the insert member and the piston so that the heat of the combustion chamber is not transferred directly to the area of the piston ring grooves. A cavity is formed in the lower portion of the insert member to substantially encompass the combustion chamber and extending closely adjacent the lip of the combustion chamber and the piston ring grooves. This cavity is closed by a second insert member and means are provided for circulating cooling oil through the cavity.

It is an object then of the present invention to produce a more efficient internal combustion engine by providing a piston assembly for such an engine comprising a hollow piston member and an insert member carried within the piston member and having a substantially spherical combustion chamber cavity therein.

It is another object of the present invention to cool the ring groove area of a piston having the combustion chamber provided therein by providing an insert member carried by the piston and having a combustion chamber cavity and means spacing the insert member from the piston to provide a thermal dam therebetween.

It is still another object of the present invention to provide cooling means for pistons having the combustion chambers therein by providing an insert member provided with a combustion chamber cavity and an annular recess surrounding the combustion chamber and means for circulating oil through the recess.

Still further objects and advantages of the present invention will readily occur to one skilled in the art to which the invention pertains upon reference to the following drawings in which like reference characters refer to like parts throughout the several views and in which.

DESCRIPTION

Figure 2:
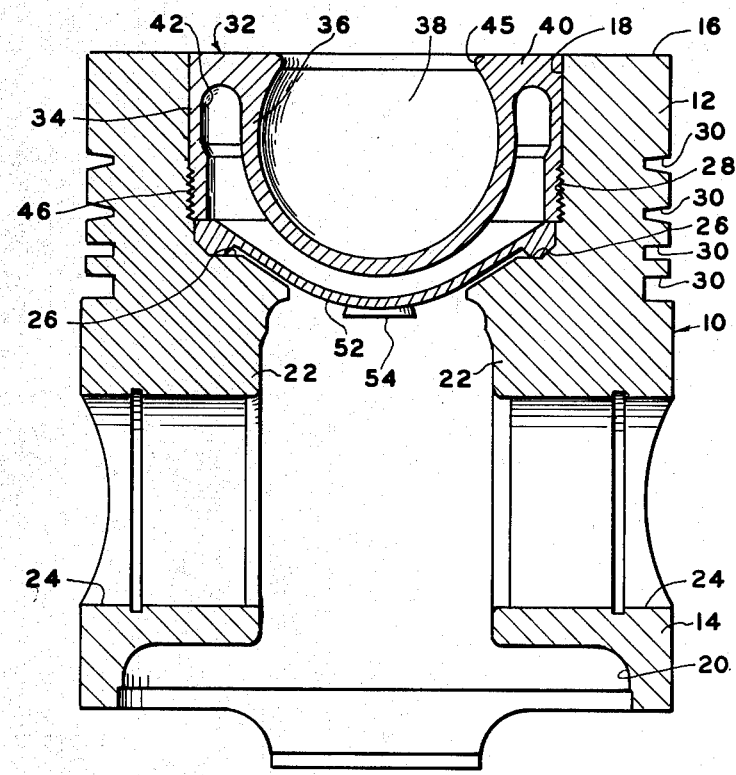
FIG. 2 is a cross sectional view taken substantially on line 2—2 of FIG. 1.

Now referring to the drawings for a more detailed description of the present invention, a preferred piston 10 is illustrated as having a head 12 and a skirt 14. The head 12 is provided with a face 16 and a substantially cylindrical recess 18 is provided in the face 16. The recess 18 extends axially into the piston 10 to communicate with a recessed portion 20 which defines the inner wall of the skirt 14 so that the piston 10 is in substantially the form of a hollow cylinder as shown.

Figure 1:
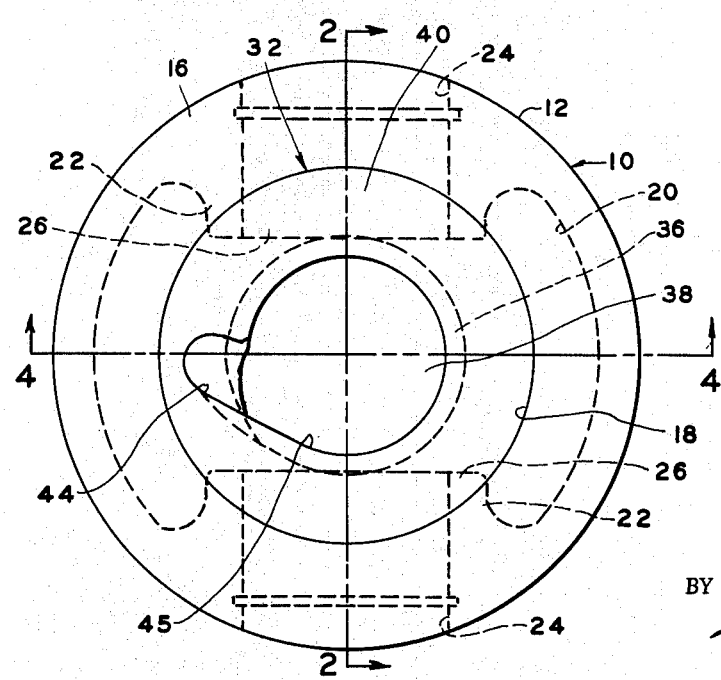
FIG. 1 is a top elevational view of a piston of the present invention.
Figure 4:
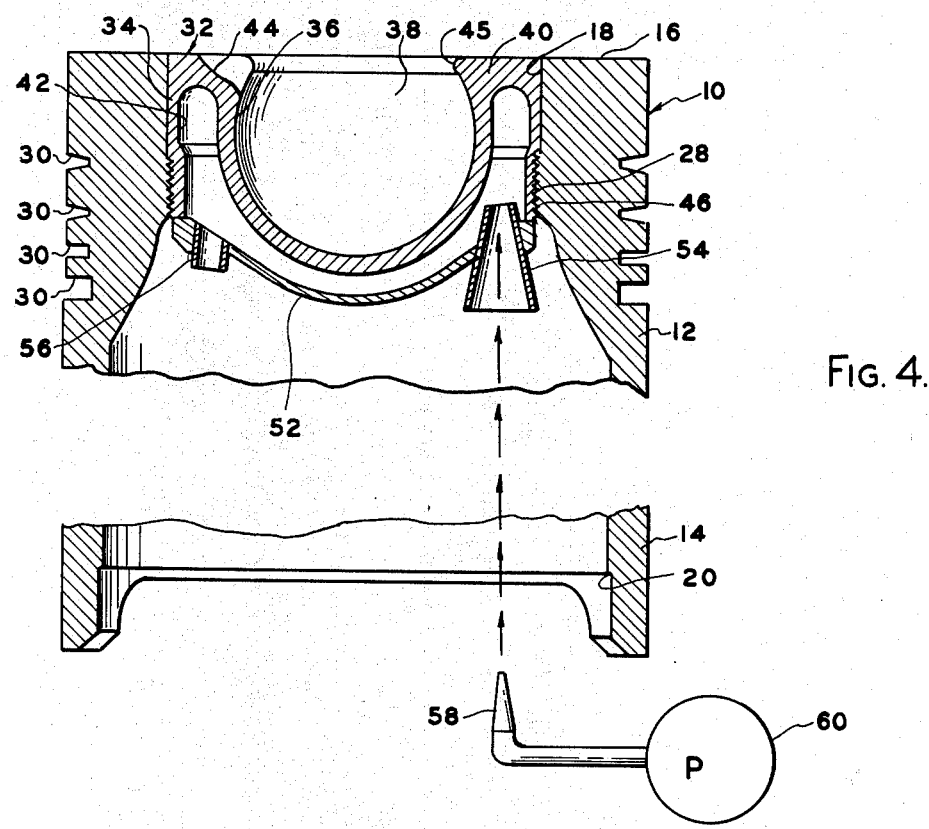
FIG. 4 is a fragmentary cross sectional view taken substantially on line 4—4 of FIGURE 1 and with some parts illustrated schematically.

Wrist pin bosses 22 extend radially inwardly into the recessed portion 20 and are provided with axially aligned openings 24 for carrying a wrist pin (not shown). The bosses 22 provide radially extending shoulder portions 26 as can be seen in FIGS. 1-2. A portion of the inner wall of the piston head 12 which defines the recess 18 is preferably threaded as shown at 28. A plurality of annular grooves 30 are provided on the outer wall of the piston head 12 to carry piston rings (not shown).

An insert member 32 is adapted to be carried in the recess 18 as will be described in greater detail below and preferably comprises an outer cylindrical wall 34 and an inner wall portion 36 defining a substantially spherical combustion chamber cavity 38. The wall 34 and inner wall portion 36 are integrally connected by a radially extending portion 40 and are spaced as shown to form a substantially annular cavity 42 surrounding the combustion chamber cavity 38. A groove 44 is provided in the face of the portion 40 as can best be seen in FIG. 1 to direct fuel from an injection nozzle (not shown) into the combustion chamber cavity 38. A lip 45 defines the entrance to the combustion chamber cavity 38.

The outer surface of the wall 34 is preferably threaded as at 46 so that the insert member 32 will be secured to the piston 10 by the corresponding threaded portions 28 and 46, and will be positioned such that the radially extending outer face of the portion 40 is substantially coplanar with the face 16 of piston head 12.

Figure 3:
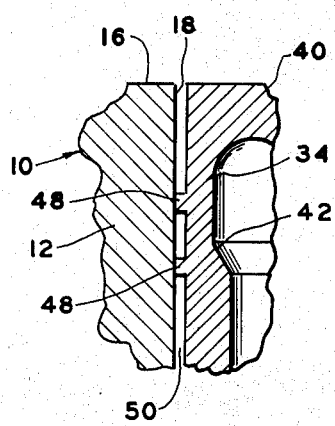
FIG. 3 is an enlarged fragmentary detail view of a portion of the structure shown in FIG. 2.

As can best be seen in FIG. 3 the outer surface of the wall 34 is also provided with a plurality of axially spaced annular projections 48. These serve to space the wall 34 of the insert member 32 from the inner wall of the piston head 12 as shown to provide an air space 50 which acts as a thermal dam between these members.

A second insert member 52 is carried in the piston recess 18 intermediate the inner end of the insert member 32 and the shoulder portions 26 defined by the pin bosses 22. The insert member 52 closes the annular cavity 42 as can best be seen in FIG. 2. A cone shaped inlet tube 54 is provided in the insert member 52 and extends upwardly into the cavity 42 as shown. An outlet tube 56 is also provided in the insert member 52. A nozzle 58 is positioned to direct oil through the inlet tube 54 into the cavity 42. The nozzle 58 is adapted for connection to the engine oil pump 60.

In the preferred embodiment of the invention illustrated, the piston 10 is constructed of a light metal such as aluminum and the insert member 32 is constructed of a high temperature metal such as stainless steel or the like. The threaded portions 28 and 46 are preferably formed to produce an interference fit between the piston 10 and the insert member 32.

The provision of the insert members of the piston assembly of the present invention makes it possible to form the cooling cavity 42 without producing a difficult casting problem. If these members were integrally connected as heretofore provided it would be impossible to remove a solid core necessary to form this cavity from the piston after solidification of the casting. Therefore it would be necessary to provide a complicated split core to form this cavity.

The cavity 42 can be easily formed in the insert member 32 and therefore a substantial reduction in the manufacturing costs of the piston assembly is produced.

The air space 50 provides an effective thermal dam between the combustion chamber 38 in the insert member 32 and the piston 10. In this way the area of the piston 10 provided with the ring grooves 30 is much cooler than it would be with a piston of ordinary construction. Further, the space 50 permits expansion of the insert member 32 at high temperatures without producing undue stresses.

During operation of the engine, oil is pumped through the nozzle 58 into the conical shaped inlet tube 54 and into the cavity 42. The reciprocating movement of the piston 10 during engine operation produces movement of the oil in the cavity 42. Because the opening of the inlet tube 54 is high in the cavity 42 and above the opening in the outlet tube 56 the oil will flow around the cavity 42 and will exhaust to the crankcase (not shown) of the engine through the outlet tube 56. In this way the cooling oil produces a cooler temperature in the vicinity of the lip 39 of the insert member 32 to reduce thermal cracking which normally occurs. The oil and the thermal dam between the combustion chamber and the piston ring grooves 30 of the piston 10 reduces temperatures in the area of the piston ring grooves 30 to reduce distortion of the piston rings and to reduce deposits in the ring grooves 30 by reducing temperatures in this area below the coking temperature of the fuel being used to operate the engine. The provision of a high temperature material for the lip 45 of the combustion chamber 38 reduces thermal cracking and breaking in this area.

It is also apparent that although I have described but one embodiment of the present invention many changes and modifications can be made without departing from the spirit of the invention as expressed by the appended claims.

I claim:

1. In an internal combustion engine a piston assembly comprising
    (a) a piston member having a hollow head portion and a skirt depending therefrom,
    (b) an insert member carried in said hollow head portion and having a combustion chamber cavity extending from the top face of said insert member into the interior of said head portion,
    (c) means spacing said insert member from said head portion whereby to form a thermal dam therebetween,
    (d) said insert member being provided with a substantially annular cavity encompassing said combustion chamber cavity,
    (e) a second insert member carried in said hollow head portion by said first mentioned insert member,
    (f) said second insert member closing said annular cavity and having an inlet and an outlet, and
    (g) means directing a flow of cooling fluid through said inlet and into said annular cavity.

2. The piston assembly as defined in claim 1 and in which said piston member is constructed of aluminum and said first mentioned insert member is constructed of stainless steel.

3. In an internal combustion engine a piston assembly comprising
    (a) a piston member having a face portion and a cylindrical recess provided in said face portion and defined by an inner annular surface,
    (b) said piston further having an outer annular surface concentric with said inner annular surface and a plurality of axially spaced piston ring grooves being provided on said outer surface substantially concentric with said recess and each of said grooves being adapted to carry a piston ring,
    (c) an insert member carried in said recess and comprising an annular wall portion and a radially extending face portion,
    (d) a combustion chamber cavity provided in said face portion of said insert member, and
    (e) means spacing said annular wall portion of said insert member from said inner annular surface of said piston member whereby to form a thermal dam between said insert member and the portion of said piston provided with said piston ring grooves.

4. The piston assembly as defined in claim 3 and in which said means comprises a plurality of axially spaced annular projections provided on the surface of said wall portion of said insert member.

5. The piston assembly as defined in claim 3 and including an annular cavity provided in said member intermediate said annular wall portion and said combustion chamber cavity.

6. In an internal combustion engine a piston assembly comprising
    (a) a piston member having a face portion and a cylindrical recess provided in said face portion,
    (b) said piston having an outer annular surface and a plurality of axially spaced grooves being provided on said outer surface substantially concentric with said recess and each of said grooves being adapted to receive a piston ring,
    (c) an insert member having a radially extending face portion and means carrying said insert member in said recess in a position such that said face portion of said insert member is substantially coplanar with said face portion of said piston member,
    (d) said insert member being provided with a combustion chamber cavity in said face portion thereof and extending into said recess, and
    (e) said insert member being spaced from a portion of the annular surface of said piston defining said cylindrical recess whereby a thermal dam is provided between said combustion chamber cavity and the area of said piston provided with said piston ring grooves.

7. The assembly as defined in claim 6 and in which said insert member is provided with an annular cavity concentric to and spaced from said combustion chamber cavity.

8. In an internal combustion engine a piston assembly comprising
    (a) a piston member having a base portion, a cylindrical recess provided in said base portion defined by an inner annular surface, said inner annular surface being provided with a threaded portion,
    (b) said piston further having an outer annular surface concentric with the said inner annular surface and a plurality of axially spaced piston ring grooves being provided on said outer annular surface substantially concentric with said recess and each of said grooves being adapted to receive a piston ring,
    (c) an insert member carried in said recess and comprising an annular outer wall having a threaded portion adapted to be received by said piston member threaded portion and a radially extending portion defining said face portion of said insert member and being substantially coplanar with said face portion of said piston member,
(d) said insert member further comprising an inner wall portion defining a combustion chamber cavity extending into said recess, and
(e) means provided on said outer annular wall of said insert member spacing said insert member from said inner annular surface of said piston member whereby to provide a thermal dam between said insert member and the area of said piston having said piston ring grooves.

9. The piston assembly as defined in claim 8 and in which said means comprises at least one annular projection provided on the outer surface of said outer wall.

10. The piston assembly as defined in claim 8 and in which said means comprises a plurality of axially spaced annular projections provided on the outer surface of said outer wall.

11. The piston assembly as defined in claim 8 and in which said inner wall and said outer wall of said insert member are spaced by said radially extending portion to define an annular cavity encompassing said combustion chamber cavity.

12. The piston assembly as defined in claim 8 and in which said threads are formed to provide an interference fit between said piston member and said insert member.

13. The piston assembly as defined in claim 8 and in which said piston member is constructed of aluminum and said insert member is constructed of stainless steel.

14. In an internal combustion engine a piston assembly comprising
(a) a piston member having a hollow head portion and a skirt depending therefrom,
(b) an insert member carried in said hollow head portion and having a combustion chamber cavity extending from the top face of said insert member into the interior of said head portion,
(c) said insert member being provided with a substantially annular cavity encompassing said combustion chamber cavity, and
(d) a second insert member carried in said hollow head portion by said first mentioned insert member, said second insert member closing said annular cavity.

15. The piston assembly as defined in claim 14 and in which said second insert member is provided with an inlet and an outlet opening to said annular cavity and including means directing a flow of cooling fluid through said inlet and into said annular cavity.

16. The piston assembly as defined in claim 14 and including means spacing said first mentioned insert member from said head portion whereby to form a thermal dam therebetween.

17. In an internal combustion engine a piston assembly comprising
(a) a piston member having a face portion and a cylindrical recess provided in said face portion and defined by an inner annular surface,
(b) said piston further having an outer annular surface concentric with said inner annular surface,
(c) an insert member carried in said recess and comprising an annular wall portion and a radially extending face portion,
(d) a combustion chamber cavity provided in said face portion of said insert member,
(e) means spacing said annular wall portion of said insert member from said inner annular surface of said piston member,
(f) said insert member being provided with an annular cavity formed intermediate said annular wall portion and said combustion chamber cavity,
(g) a second insert member carried in said recess and closing said annular cavity,
(h) said second insert member being provided with an inlet and an outlet opening into said annular cavity, and
(i) means directing a cooling fluid through said inlet and into said annular cavity.

18. In an internal combustion engine a piston assembly comprising
(a) a piston member having a face portion and a cylindrical recess provided in said face portion and defined by an inner annular surface,
(b) said piston further having an outer annular surface concentric with said inner annular surface,
(c) an insert member carried in said recess and comprising an annular wall portion and a radially extending face portion,
(d) a combustion chamber cavity provided in said face portion of said insert member,
(e) means spacing said annular wall portion of said insert member from said inner annular surface of said piston member,
(f) said insert member being provided with an annular cavity formed intermediate said annular wall portion and said combustion chamber cavity, and
(g) a second insert member carried in said recess and closing said annular cavity.

19. In an internal combustion engine a piston assembly comprising
(a) a piston member having a face portion and a cylindrical recess provided in said face portion,
(b) said piston having an outer annular surface and a plurality of axially spaced grooves being provided on said outer surface substantially concentric with said recess and each of said grooves being adapted to receive a piston ring,
(c) an insert member having a radially extending face portion and means carrying said insert member in said recess in a position such that said face portion of said insert member is substantially coplanar with said face portion of said piston member,
(d) said insert member being provided with a combustion chamber cavity in said face portion thereof and extending into said recess,
(e) said insert member being spaced from a portion of the surface of said piston defining said recess whereby a thermal dam is provided between said combustion chamber cavity and the area of said piston provided with said piston ring grooves,
(f) said insert member being provided with an annular cavity concentric to and spaced from said combustion chamber cavity,
(g) a second insert member carried in said recess and closing said annular cavity, and
(h) means circulating a cooling fluid through said annular cavity.

20. In an internal combustion engine a piston assembly comprising
(a) a piston member having a face portion and a cylindrical recess provided in said face portion,
(b) said piston having an outer annular surface and a plurality of axially spaced grooves being provided on said outer surface substantially concentric with said recess and each of said grooves being adapted to receive a piston ring,
(c) an insert member having a radially extending face portion and means carrying said insert member in said recess in a position such that said face portion of said insert member is substantially coplanar with said face portion of said piston member,
(d) said insert member being provided with a combustion chamber cavity in said face portion thereof and extending into said recess,
(e) said insert member being spaced from a portion of the surface of said piston defining said recess whereby a thermal dam is provided between said combustion chamber cavity and the area of said piston provided with said piston ring grooves, and
(f) a second insert member carried in said recess and closing said annular cavity.

21. In an internal combustion engine a piston assembly comprising
(a) a piston member having a base portion, a cylindrical recess provided in said base portion defined by an inner annular surface, said inner annular surface being provided with a threaded portion,
(b) said piston further having an outer annular surface concentric with the said inner annular surface and a plurality of axially spaced grooves being provided on said outer annular surface,
(c) an insert member carried in said recess and comprising an annular outer wall having a threaded portion adapted to be received by said piston member threaded portion and a radially extending portion defining said face portion of said insert member and being substantially coplanar with said face portion of said piston member,
(d) said insert member further comprising an inner wall portion defining a combustion chamber cavity extending into said recess,
(e) means provided on said outer annular wall of said insert member spacing said insert member from said inner annular surface of said piston member,
(f) said inner wall and said outer wall of said insert member being spaced by said radially extending portion to define an annular cavity encompassing said combustion chamber cavity,
(g) a second insert member carried in said recess and closing said annular cavity,
(h) said second insert member having an inlet and an outlet open to said annular cavity, and
(i) means directing a cooling fluid through said inlet and into said cavity.

22. In an internal combustion engine a piston assembly comprising
(a) a piston member having a base portion, a cylindrical recess provided in said base portion defined by an inner annular surface, said inner annular surface being provided with a threaded portion,
(b) said piston further having an outer annular surface concentric with the said inner annular surface and a plurality of axially spaced grooves being provided on said outer annular surface substantially concentric with said recess and each of said grooves being adapted to receive a piston ring,
(c) an insert member carried in said recess and comprising an annular outer wall having a threaded portion adapted to be received by said piston member threaded portion and a radially extending portion defining said face portion of said insert member and being substantially coplanar with said face portion of said piston member,
(d) said insert member further comprising an inner wall portion defining a combustion chamber cavity extending into said recess,
(e) means provided on said outer annular wall of said insert member spacing said insert member from said inner annular surface of said piston member,
(f) said inner wall and said outer wall of said insert member being spaced by said radially extending portion to define an annular cavity encompassing said combustion chamber cavity, and
(g) a second insert member carried in said recess and closing said annular cavity.

References Cited by the Examiner

UNITED STATES PATENTS

| | | | |
|---|---|---|---|
| 2,720,870 | 10/1955 | Grob | 123—32.2 |
| 2,800,119 | 7/1957 | Schmidl | 123—41.35 |
| 2,865,348 | 12/1958 | Kraemer | 123—32.2 |
| 2,882,106 | 4/1959 | Meurer | 123—32.2 |

FOREIGN PATENTS

| | | |
|---|---|---|
| 126,451 | 1/1932 | Austria. |
| 634,700 | 11/1927 | France. |
| 871,915 | 12/1959 | Great Britain. |
| 892,171 | 11/1960 | Great Britain. |

KARL J. ALBRECHT, *Primary Examiner.*